(12) United States Patent
Martin (10) Patent No.: US 7,815,458 B2
(45) Date of Patent: Oct. 19, 2010

(54) POWER SOURCE COUPLING AND COUPLER HAVING A POWER SOURCE COUPLING

(75) Inventor: Dietmar Martin, Braz (AT)

(73) Assignee: Josef Martin GmbH & Co. KG, Braz (AT)

( * ) Notice: Subject to any disclaimer, the term of this patent is extended or adjusted under 35 U.S.C. 154(b) by 0 days.

(21) Appl. No.: 12/547,384

(22) Filed: Aug. 25, 2009

(65) Prior Publication Data

US 2010/0052312 A1   Mar. 4, 2010

(30) Foreign Application Priority Data

Aug. 25, 2008   (CH) ................................. 001357/08

(51) Int. Cl.
*H01R 4/50* (2006.01)
(52) U.S. Cl. ....................................... 439/345
(58) Field of Classification Search ................. 439/345, 439/346; 285/26, 45
See application file for complete search history.

(56) References Cited

FOREIGN PATENT DOCUMENTS

| DE | 197 51 292 C1 | 2/1999 |
|---|---|---|
| DE | 199 38 876 A1 | 3/2001 |
| DE | 601 02 711 T2 | 3/2005 |
| DE | 10 2004 014824 | 10/2005 |
| EP | 1 365 074 A | 11/2003 |
| EP | 1 950 485 A | 7/2008 |
| JP | 08 049253 | 2/1996 |
| WO | WO 97/17564 A | 5/1997 |

*Primary Examiner*—T C Patel
*Assistant Examiner*—Vladimir Imas
(74) *Attorney, Agent, or Firm*—Morriss O'Bryant Compagni, P.C.

(57) ABSTRACT

The present invention relates to a power source coupling for connecting two power coupling parts (5, 6): a first power coupling part (5) which is mounted on a first component (1) so as to be longitudinally displaceable and has a first connecting plate (16) with one or more first power coupling elements (18), and a second power coupling part (6) which is mounted on a second component (4) so as to be displaceably mounted between a first and a second position. The second power coupling part (6) has a second connecting plate (17) with one or more second power coupling elements (19) which are able to cooperate with the first power coupling elements (18) when the first power coupling part (5) is in the first position. A protective element (51) is provided on the first power coupling part (5) so as to be adjustable in position, and which in the first position of the power coupling part (5) covers the first power coupling elements (18) when the second power coupling part (6) is not attached, and in the second position of the power coupling part (5) is in an open position.

16 Claims, 8 Drawing Sheets

POWER SOURCE COUPLING AND COUPLER HAVING A POWER SOURCE COUPLING

BACKGROUND OF THE INVENTION

CROSS-REFERENCE TO RELATED APPLICATIONS

This application claims priority to CH01357/08 filed on Aug. 25, 2008, the entirety of each of which is incorporated by this reference.

1. Field of the Invention

The invention relates to a power source coupling for connecting two mutually cooperating power coupling parts and more particulary to a power source coupling having a first power coupling part mounted on a first component so as to be longitudinally displaceable and having a first connecting plate with one or more first power coupling elements, a second power coupling part that is mounted on a second component so as to be displaceably mounted between a first and a second position and having a second connecting plate with one or more second power coupling elements that are able to cooperate with the first power coupling elements when the first power coupling part is in the first position, and mutually cooperating guiding and centering means which are provided on the components and/or connecting plates to align the connecting plates relative to one another, and a coupler for mounting tools to a machine having a power source coupling.

2. Background

Couplings are used in particular for heavy machinery such as excavators, crawlers, or agricultural equipment, to which attachments such as excavator shovels or buckets, hammers, vibrating plate compactors, and the like must be affixed, whereby actuators which must be supplied with power are provided on the attachments. Hydraulic lines are frequently used for supplying this power. However, other power supplies such as electric cables or pneumatic lines must sometimes be connected using the power coupling parts. The attachments are usually connected to a movable arm of the machine.

It is known from the prior art to bring the two main coupling parts via a swivel motion into a locked position, in which a locking device is then brought into the closed position by means of an actuator mounted on one of the main coupling parts, thereby completing the mechanical connection of the main coupling parts and thus, the connection of the attachment to the machine. To avoid having to then connect the power coupling parts to one another by hand, it is also known to provide connecting devices which allow connection of the power coupling parts to be completed automatically, i.e., nonmanually. These connecting devices from the prior art are either designed with their own actuators, or are brought into contact automatically via the arm of the machine when the main coupling parts are joined together.

DE 10 2004 014 824 A1 discloses a generic coupling in which one connecting element is rigidly affixed to the first main coupling part and the other connecting element is pivotably held on the second main coupling part with deformation of rubber spring bearings. There is a risk that the rubber spring bearings may lose their elasticity as the result of aging, and that the power coupling elements may then no longer reliably close. For this coupling the locking device and the connecting device have a one-piece design in the form of a locking pin.

DE 601 02 711 T2 discloses an approach which is mechanically complex and also space-consuming, having wedge-shaped sliding guides in which pins are guided.

Thus it would be advantageous to provide a power source coupling for power coupling elements that is not susceptible to soiling. It would be a further advantage to provide a power source coupling that is resistant to soiling, robust, and economical to manufacture. It would be a further to provide a coupler for the connection of attachments for machines, in particular for excavators, that is equipped with a soil-resistant power source coupling.

SUMMARY OF THE INVENTION

The foregoing advantages are achieved according to the invention for a power source coupling for connecting two mutually cooperating power coupling parts and more particulary to a power source coupling having a first power coupling part mounted on a first component so as to be longitudinally displaceable and having a first connecting plate with one or more first power coupling elements, a second power coupling part that is mounted on a second component so as to be displaceably mounted between a first and a second position and having a second connecting plate with one or more second power coupling elements that are able to cooperate with the first power coupling elements when the first power coupling part is in the first position, and mutually cooperating guiding and centering means that are provided on the components and/or connecting plates to align the connecting plates relative to one another. A protective element is provided on the first power coupling part so as to be adjustable in position, and which in the first position of the power coupling part covers the first power coupling elements when the second power coupling part is not attached, and in the second position of the power coupling part is in an open position. The power source coupling according to the invention has the advantage that when the first power coupling elements are not coupled to the second power coupling elements the first power coupling elements are protected by the protective element, for example in the form of a protective cap. Although in principle a separate drive may be provided for actuating the protective element, forced guidance may be provided for displacing or swiveling the protective element.

In one advantageous embodiment the protective element is situated on the first power coupling part so as to be pivotable about a rotational axis. This approach may be implemented with little expenditure of effort. It is advantageous to provide forced guidance of the protective element, which causes the protective element to be swiveled or displaced from the first to the second position when the first power coupling part is displaced. Such forced guidance may be implemented by cooperation of parts of the protective element with stationary parts of the first component.

According to one embodiment, the protective element is pretensioned in the first position by a spring means. This has the advantage that the forced guidance only has to swivel the protective element into the open position. The protective element may rest against the second power coupling part when the power coupling parts are connected to one another.

The forced guidance is advantageously provided by guide surfaces situated on the first component and on the protective element. This is a simple and robust embodiment. It is practical for the component to have two interspaced side parts, between which the first power coupling part is guided in a longitudinally displaceable manner. In this case the forced guidance may be realized by the cooperation of parts of the movable protective element with the stationary side parts. It is particularly advantageous to provide guide surfaces on the stationary side parts which cooperate with corresponding guide surfaces on the protective element.

An actuator is provided for displacement of the first power coupling part in order to move the same from the first to the second position, and vice versa. As the result of displacing the first power coupling part, the connecting plates present on the power coupling parts are brought into contact with one another, thus enabling connection of the power coupling elements.

The subject matter of the present invention further concerns a coupling for the mounting of tools to a machine having a power source coupling, such as excavators, using a power source coupling. Such a coupling has a first main coupling part on which the first power coupling part is provided, a second main coupling part on which the second power coupling part is provided, and an actuator for displacement of the first power coupling part.

Providing a power source coupling according to the invention on a coupling for attachments has the advantage that the attachment may perform additional functions. An excavator blade may then also perform a tilting motion, for example.

The actuator advantageously drives a movable sliding part that is in mechanical connection with the first power coupling part. This has the advantage that a displacement of the first power coupling part is simultaneously achieved when the attachment is mechanically connected. This means that an additional drive is not necessary. Even though the direction of displacement of the power coupling part may in principle be parallel to the motion of the actuator, the direction of displacement of the power coupling part is at an angle >0 and <180 degrees relative to the direction of displacement of the sliding part.

According to one embodiment, the first main coupling part includes two interspaced side parts on which a pin receptacle for a first pin is provided on one side. In addition, the actuator which drives a movable locking device, which may be brought into engagement with a second pin, is provided in the space defined between the side parts. It is practical for the sliding part to be connected to the movable locking device. The sliding part is designed as a spline which cooperates with a guide surface of the first connecting plate to produce a forcibly guided motion.

BRIEF DESCRIPTION OF THE DRAWINGS

The invention is described below with reference to the figures by way of example. The figures show the following.

DETAILED DESCRIPTION OF THE ILLUSTRATED EMBODIMENTS

The coupling illustrated in the figures includes a first main coupling part 1 and an additional main coupling part 2 for affixing an attachment 4 (in the form of an excavator bucket, for example) to a hydraulic arm 3 of a machine. The two main coupling parts 1, 2 may each be fixedly mounted to the machine and to the attachment 4 by welding, for example. However, the main coupling parts 1 and 2 are configured to be interchangeably affixed to the attachment 4 and/or to the machine or its arm 3 by screws, for example.

Figure 1:
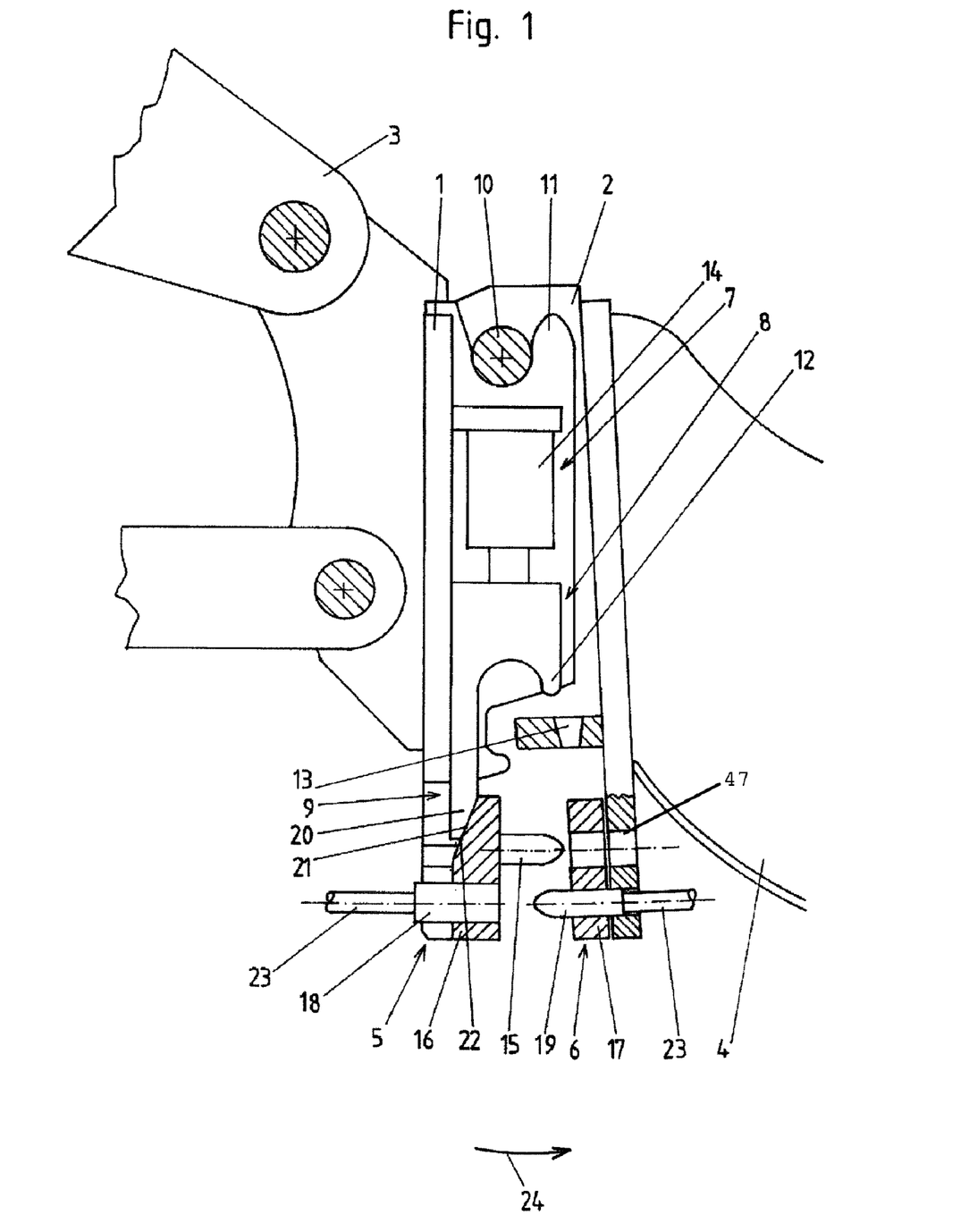
FIG. 1 shows a coupling for the detachable connection of first and second main coupling parts to an attached power source coupling for power coupling elements, before the main coupling parts are swiveled together.

In the position illustrated in FIG. 1 the holding claw 11, in this case situated on the first main coupling part 1, is engaged behind the pin 10b, in this case situated on the additional main coupling part 2. One way to achieve this position is to place the pin 10 of the attachment 4 in the holding claw 11. In particular for heavier attachments, however, the pin 10 for the attachment 4 is generally engaged behind the holding claw 11 by use of the drive for the arm 3.

In the position shown in FIG. 1, neither the locking pin 12 and the locking receptacle 13 for the locking device 8 on the one hand, nor the power coupling parts 5 and 6 on the other hand, are engaged with one another. In the present exemplary embodiment, starting from the position shown in FIG. 1 the two main coupling parts 1 and 2 are first swiveled in direction 24 into the locked position shown in FIG. 2, with the pin 10 acting as a rotational axis. Even though this is one exemplary embodiment, according to the invention it is not absolutely necessary for the two main coupling parts 1 and 2 to be brought into the locked position via a swivel motion. When the holding claw 11 has an appropriate design, it is also possible for the first main coupling part 1 to be pushed by means of the arm 3 in a linear motion onto the additional main coupling part 2 of the attachment 4.

Figure 2:
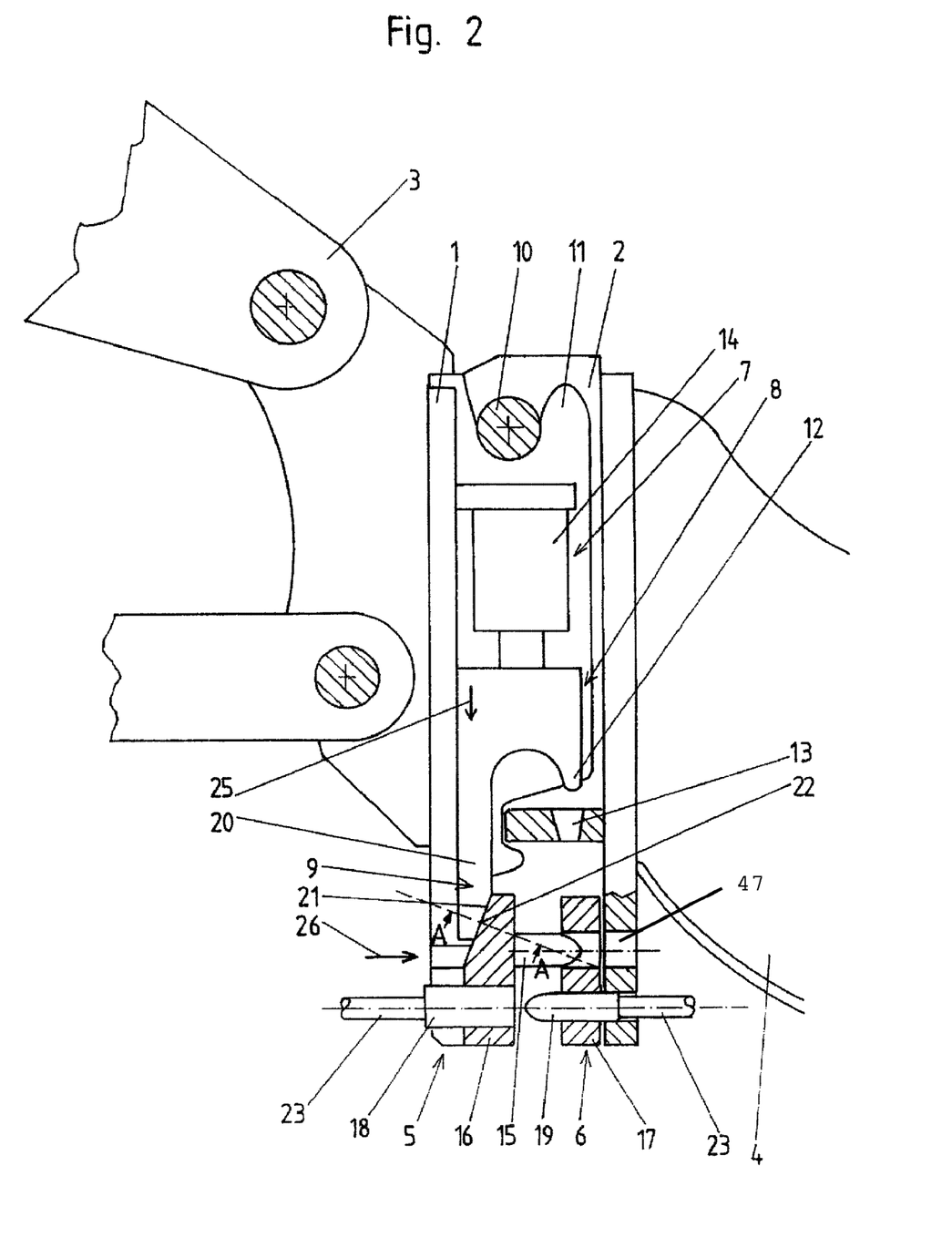
FIG. 2 shows the coupling in the locked position before the actuator is actuated.

In the locked position shown in FIG. 2 it is then possible to bring the locking device 8 and the connecting device 9 into their respective closed positions. Before this is carried out, neither the power coupling parts 5 and 6 on the one hand nor the locking pin 12 and the locking receptacle 13 on the other hand are engaged with one another. To then achieve the mechanical locking of the main coupling parts 1 and 2 to one another and also to join the power coupling parts 5 and 6 together, it is provided that the common actuator 7 actuates both the locking device 8 and the connecting device 9. In the exemplary embodiment shown, each unit undergoes a linear motion. With regard to the effect on the locking device 8, the locking pin 12 is pushed in direction 25 into the locking receptacle 13. At the same time, the spline 20 which is forcibly connected to the locking pin 12 and the actuator 7 (because it is fixedly mounted thereto) is likewise pushed in direction 25, causing its wedge surface 21 to be displaced along the guide surface 22, which in the present case has a corresponding wedge-shaped design. As a result, the connecting plate 16 for the first power coupling part 5 which bears the guide surface 22 is pushed in direction 26 onto the second connecting plate 17, which in this exemplary embodiment is rigidly mounted to the second main coupling part 2. In the exemplary embodiment shown, the wedge surfaces 21, 22 are designed in such a way that the directions of motion 25 and 26 are at right angles to one another. However, this is not mandatory. Other angles between the directions of motion 25 and 26 are also possible. Exemplary embodiments are also conceivable in which the motion to be completed for locking the main coupling parts 1 and 2 and the power coupling parts 5 and 6 is not strictly linear, but, rather, is rotational or linear/rotational.

Figure 3:
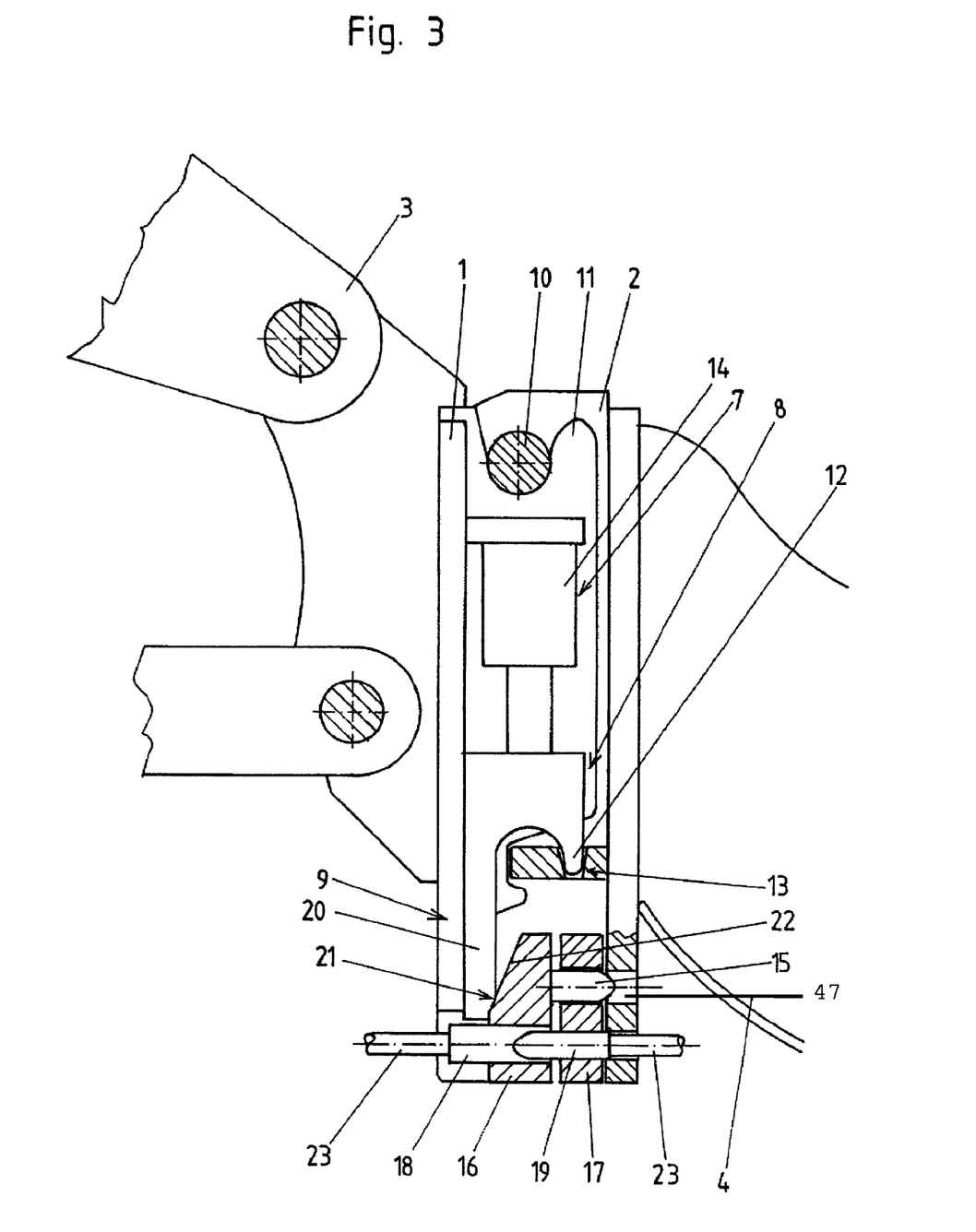
FIG. 3 shows the coupling in the final locked position.
Figure 4:
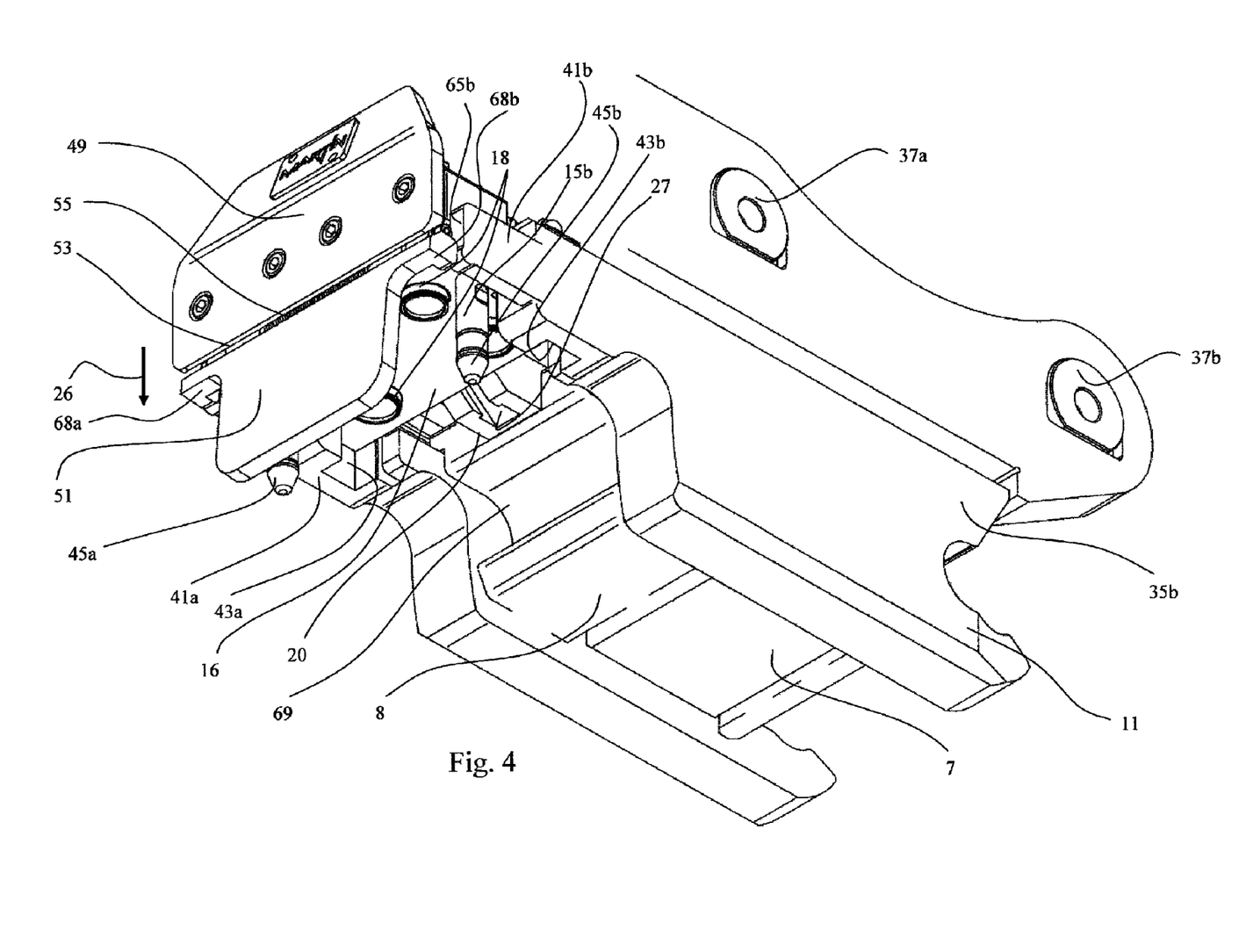
FIG. 4 shows a perspective bottom view of the first main coupling part, with the protective element folded up and the power coupling elements visible.

As shown in FIGS. 1 through 3, the locking pin 12 and the wedge surface 21 of the spline 20 are two separate components which are spaced apart, but which as implemented in the exemplary embodiment shown here have a forcibly connected design. In the exemplary embodiment shown, this is achieved by providing the locking pin and the wedge surface as one piece on a common support so that, as described above, they may be displaced synchronously and parallel to one another by the actuator 7 in direction 25 and in the opposite direction. In terms of the most compact design possible, it is beneficial for the wedge surface 21 and the locking pin 12 to be spaced apart in the direction of their mutual displacement 25, as implemented in the exemplary embodiment shown. As illustrated in FIGS. 1 through 3, the spline 20, i.e., the wedge surface 21, is configured to project beyond the locking pin 12 in direction 25. However, a reverse configuration is also possible. For guiding the connecting plate 16 in direction 26, in addition to the guide pin 15 track-like guides or the like may also be provided on the first main coupling part 1 which cause a linear forced guidance of the connecting plate 16 in direction 26 and/or in the opposite direction when it is displaced relative to the first main coupling part 1. The second connecting plate 17 may be fixedly mounted to the second main coupling part 2. It is also possible to provide the guide pin 15 on the second main coupling part 2. This arrangement has the advantage that there is less risk that the guide pin 15 will be damaged (deformed), because in the connected state, i.e., when the attachment is in use, the guide pin 15 is protected by the guide pin receptacle 47. In the disconnected state the attachment is not in use, and with careful storage there is very little risk of damage to the guide pin 15.

To ensure the strictly linear motion of the power coupling parts 5 and 6 or of their connecting plates 16 and 17 toward one another in the example shown, a linear guide is provided in the form of the guide pin 15. This guide pin ensures that the male power coupling element 19 passes precisely into the female power coupling element 18, thereby producing a fluid-tight seat, in particular for hydraulic or pneumatic power coupling parts. Reference numeral 23 shows by way of example the hydraulic or pneumatic hoses to be connected. Instead of these, of course, electrical, optical, or other cables may be connected to one another. The design of the coupling is not changed thereby. The number of power coupling elements 18 and 19 to be connected to one another may also vary. Furthermore, the male and/or female power coupling elements 18, 19 may of course be respectively situated on the connecting plate 16 or on the connecting plate 17. Any given number of different designs are possible in this regard. It is only important that the male and female power coupling elements 18, 19 are situated in such a way that they may be brought together in connection by moving the connecting plates 16 and 17 toward one another. In any case, the power coupling parts 5, 6 are designed as plug-in connections, since these may be joined together in a particularly simple manner.

In the exemplary embodiment shown, the actuator 7 is designed as a hydraulic piston-cylinder unit 14. However, this is not mandatory. The actuator 7 may also be driven by pneumatic or electrical means, or in other ways such as by magnetic means, for example.

FIG. 3 shows the final locked position in which the locking pin 12 in this case engages in the locking receptacle 13 with a positive fit, thus ensuring a mechanical connection between the first main coupling part 1 and the additional main coupling part 2 which is free of play. In this position the power coupling parts 5 and 6 are likewise joined together, with the male power coupling elements 19, optionally in a fluid-tight manner, resting in the female power coupling elements 18, thereby establishing the connection between the two power coupling parts 5 and 6.

FIGS. 4 through 7 show one exemplary embodiment of the coupling in which a pin 10a is used instead of the locking pin 12. The power coupling parts 5 and 6 and the main coupling parts 1 and 2 are unlocked and separated in reverse order, and likewise have a design that is fully automated, i.e., without additional manual operations. For example, for this purpose a forced connection of the connecting plate 16 to the spline 20 may be provided which allows the connecting plate 16 to be pulled from the forcibly connected connecting plate 17, opposite to direction 26, when the spline 20 is retracted opposite to direction 25. In this exemplary embodiment, a head 29 (FIG. 29 [sic; 7]) having undercuts 30 and which engages-with an undercut groove 27 (FIG. 4) is provided for establishing the forcible connection when the connecting plate 16 is pulled from the connecting plate 17. The undercuts 30 of this head 29 lie against sliding surfaces of the undercut groove 27. The shoulders 30 as well as the sliding surfaces extend parallel to the wedge surface 21 and to the guide surface 22, thus allowing displacement of the head 29 in the undercut groove 27 parallel to the wedge surface 21 and to the guide surface 22. In the exemplary embodiment shown, the undercut groove 27 is milled into the spline 20, and the head 29 is fastened above the neck on the connecting plate 16 or is integrally molded thereon in one piece. However, this is not mandatory, it being possible to also provide a corresponding head with a neck on the spline 20 and to provide the undercut groove 27 in the connecting plate 16.

This configuration ensures that, as the result of the cooperation of the shoulder 30 and the sliding surfaces of the groove 27, the connecting plate 16 is pulled from the connecting plate 17 as soon as the spline 20 is retracted opposite to direction 25. This causes the female and male power coupling elements 18 and 19 to separate. As previously described, however, this is only one possibility for separating the power coupling elements 18 and 19. It is also possible to separate the connecting plates 16 and 17 using other measures. For example, corresponding hydraulically or electrically driven pins could be provided in one of the connecting plates 16 or 17 which, when appropriately actuated, push the connecting plates 16 and 17 away from one another and therefore separate same.

In the exemplary embodiment shown, the actuator 7 is situated on the first main coupling part 1, and therefore on the arm 3 of the machine. This is beneficial, since as a rule the power supply for the machine is provided via the arm 3. However, the invention is not limited to this variant. The choice of which component to provide on the attachment 4 and which to provide on the arm 3 or on the machine itself is subject to the discretion of one skilled in the art. Alternative configurations may be of interest in particular when the power supply is provided not via the machine, but via some other power source.

Figure 5:
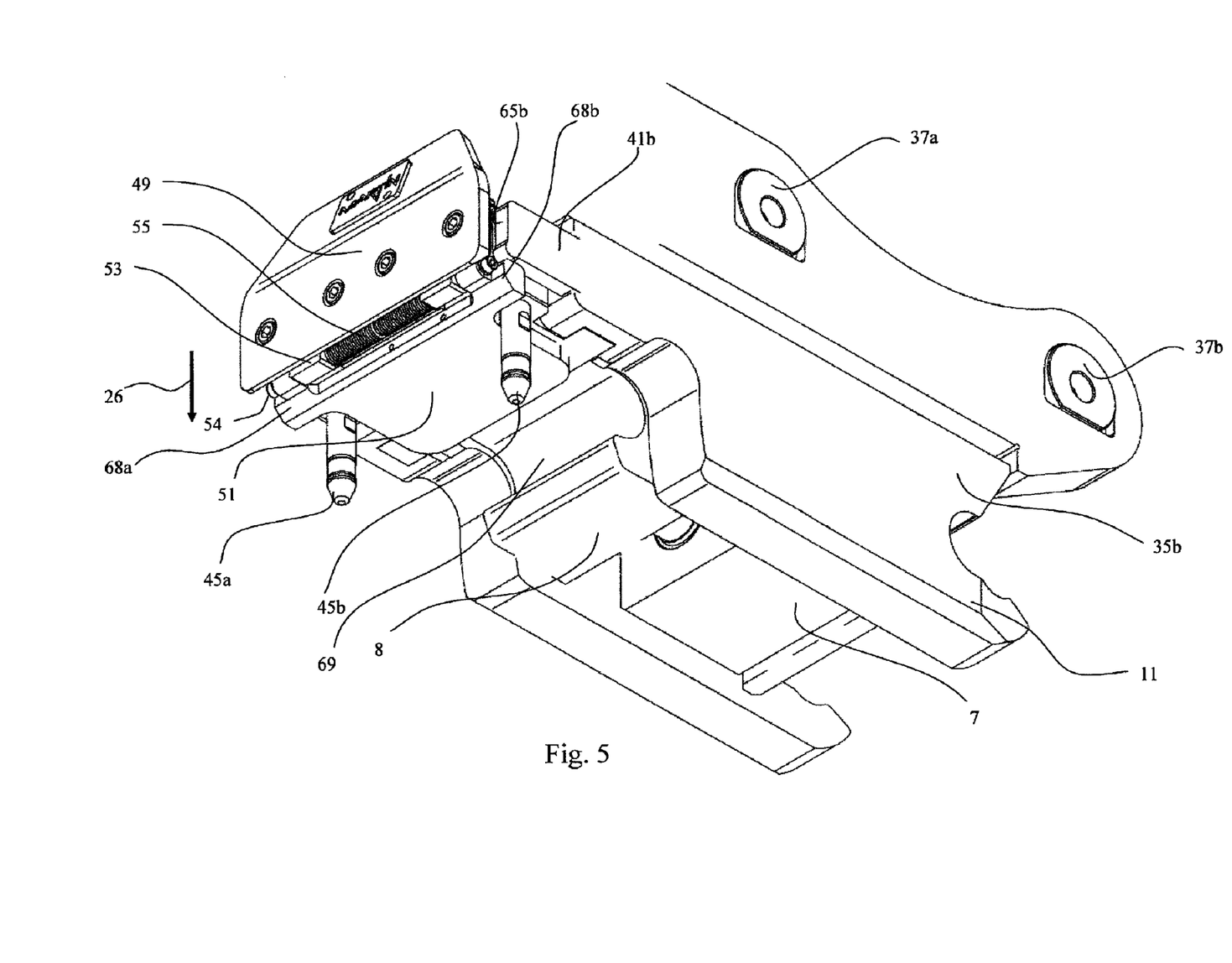
FIG. 5 shows a perspective bottom view of the first main coupling part in which the power coupling elements are protected by the protective element.
Figure 6:
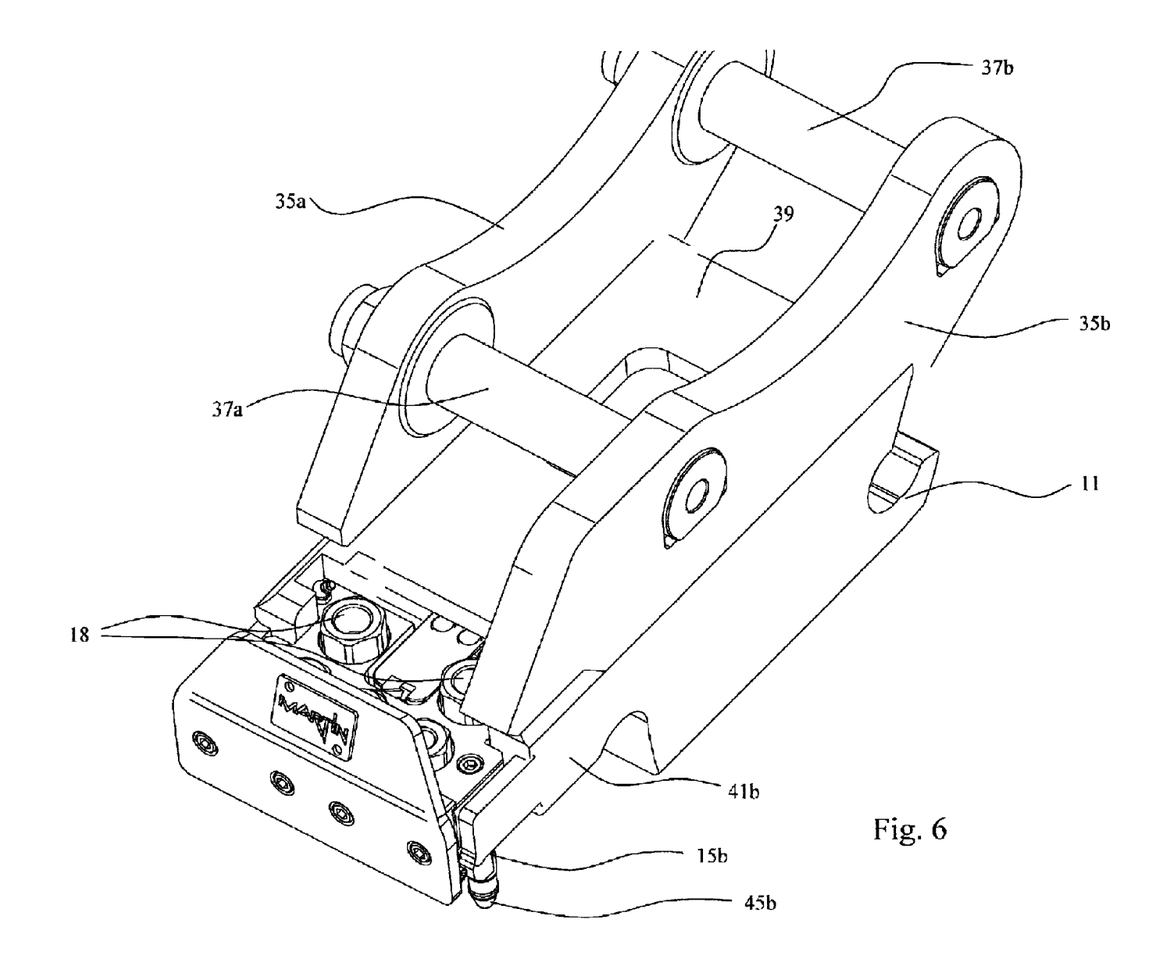
FIG. 6 shows a perspective top view of the first main coupling part.

The first main coupling part shown in FIGS. 4 through 7 has two mutually spaced side parts 35a, 35b which are connected by pins 37a, 37b and a mounting plate 39. The actuator 7 and the locking device 8 are situated between the side parts 35a, 35b and below the mounting plate 39 (FIG. 6). The first power coupling part 5 is situated between two elongated arms 41a, 41b of the side parts 35a, 35b, on the side of the side parts 35a, 35b opposite from the claw 11. The power coupling part 5 is guided in a longitudinally displaceable manner in guide grooves 43a, 43b in the side parts 35a, 35b (arrow 26). The power coupling part 5 has a first connecting plate 16 in which multiple female power coupling elements 18 are mounted at a distance from one another. To simplify the drawing in FIG. 6 the connecting lines to the power coupling elements 18 are not shown. Two oppositely situated guide pins 15a, 15b are provided on the power coupling part. As described above, the guide pins 15a, 15b may also be situated on the second power coupling part 6. The guide pins 15a, 15b have conical heads 45a and 45b which allow insertion into a corresponding guide pin receptacle 47 (FIGS. 1 through 3), even when the first and second main coupling parts 1, 2 are not exactly aligned with one another.

Figure 7:
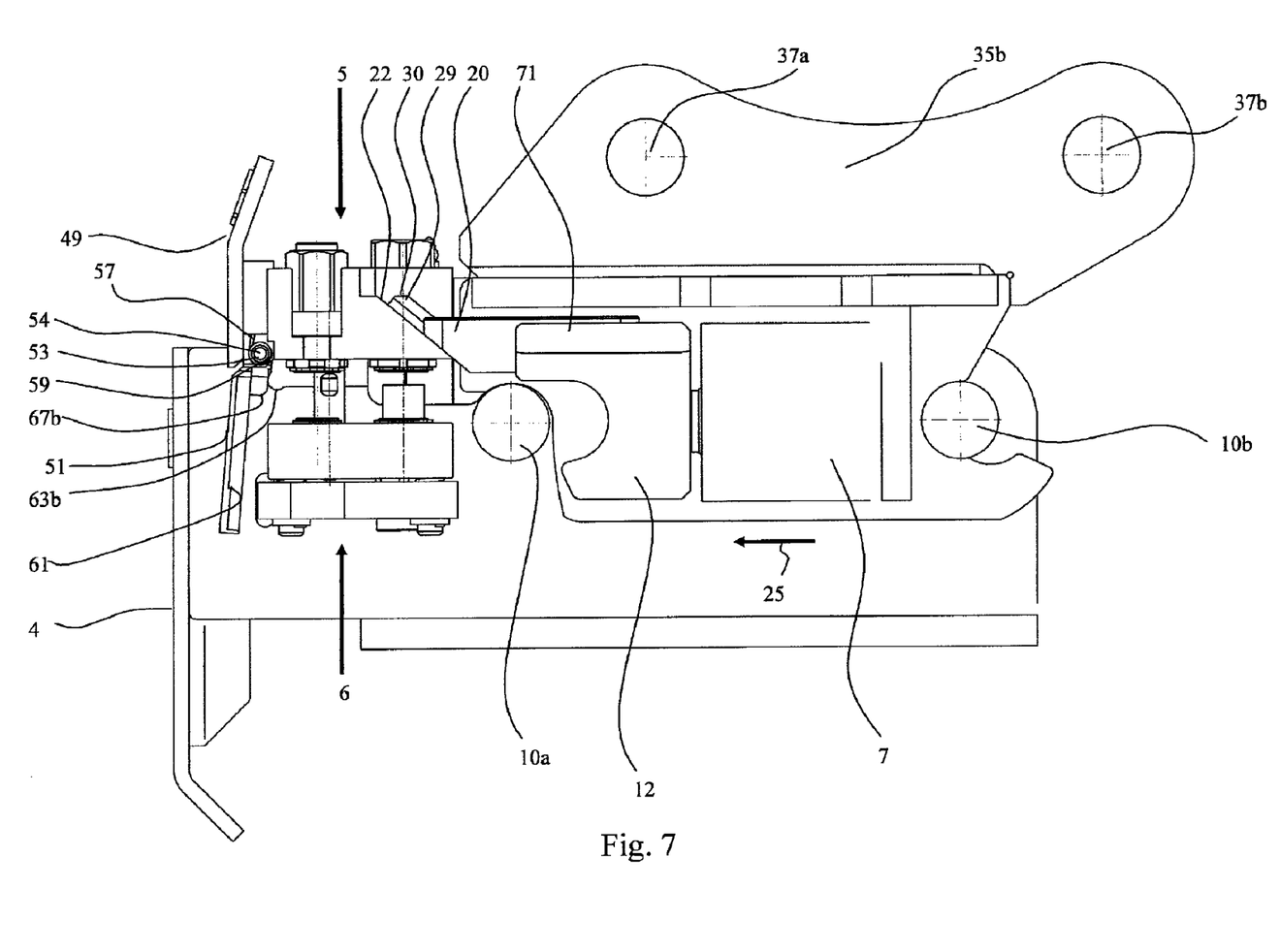
FIG. 7 shows a schematic longitudinal section of the main coupling parts as shown in FIG. 2, in the locked position before the actuator is actuated.

A protective plate 49 is fixedly mounted on the end face of the first power coupling part 5 which is designed to protect the hydraulic hose connections from damage. Below the protective plate 49, a protective cover 51 is articulatedly connected to the first power coupling part 5 by means of a hinge or axis 53 (rotational axis 54). A leg spring 55 which engages with one leg 57 on the power coupling part 5 and with the other leg 59 on the protective cover 53 (FIG. 5) pretensions the protective plate 53 in a closed position in which the protective plate covers the power coupling parts 18 (FIGS. 7 and 5). On the side facing the power coupling elements 18 the protective cover 51 has cutouts 61 which are used to accommodate the parts of the power coupling elements 18 which project from the connecting plate 16. Alternatively, the protective cover 51 may have a single large recess which extends to the edges of the cover. The protective plate 51 is therefore in an open position when an attachment 4 is not connected. When an attachment is connected, the protective plate swivels into the closed position if the attachment 4 has no power source coupling. The power coupling elements are thus reliably protected from soiling. However, if the attachment is provided with a power connection, the protective plate 51 swivels only until it reaches a stop on the attachment 4.

To fold up the protective cover 51, forced guidance is provided between the protective cover 51 and the side parts 35a, 35b. This forced guidance is implemented on the one hand by curved first guide surfaces 63a, 63b provided on the end faces 65a, 65b of the arms 41a, 41b, and on the other hand by second guide surfaces 67a, 67b provided on the protective cover 51. For this purpose, at a short distance from the rotational axis the protective cover has two lateral projections 68a, 68b which define the stop face for the guide surfaces 63.

Figure 8:
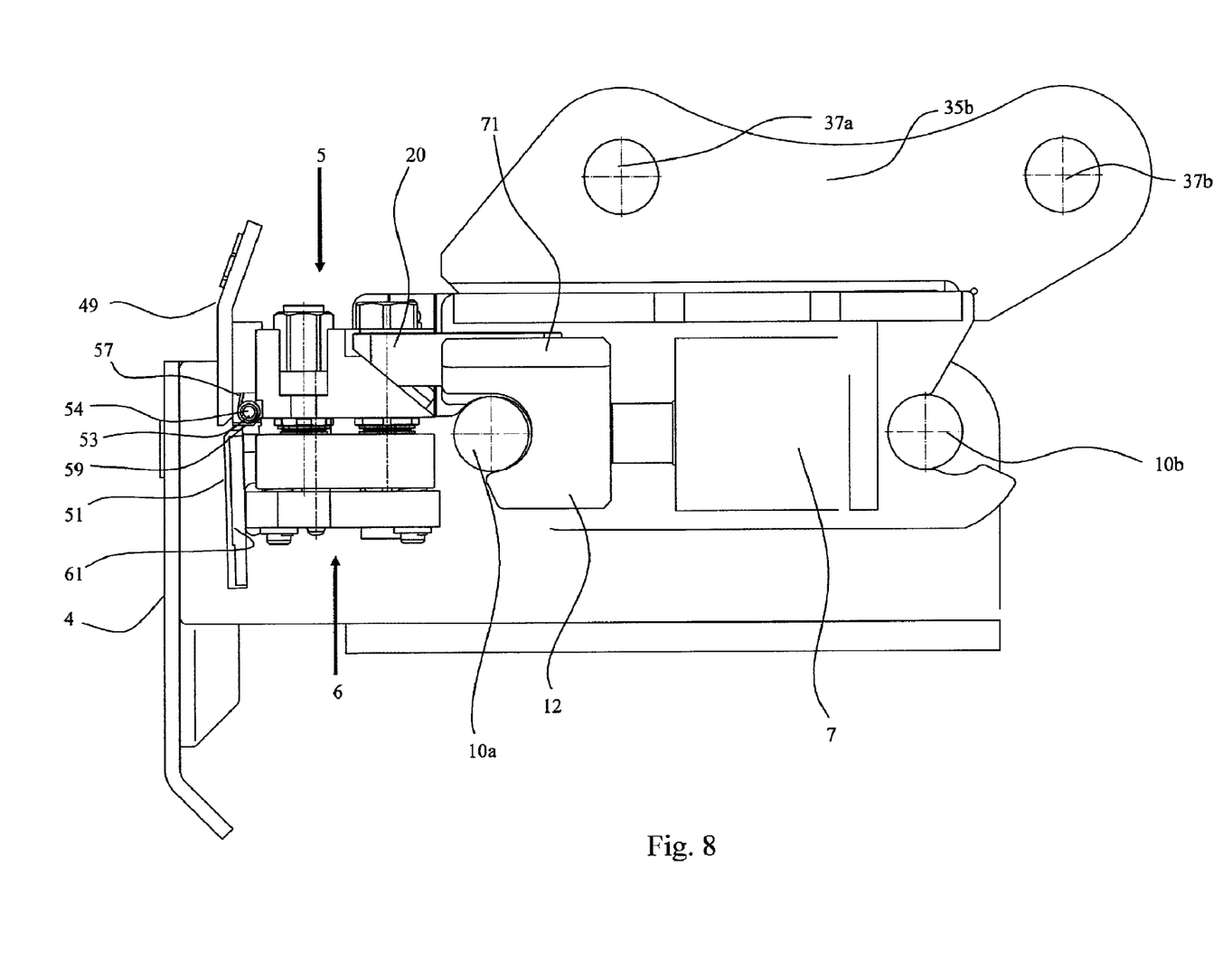
FIG. 8 shows a schematic longitudinal section of the main coupling parts of FIG. 7, after the actuator is actuated.

The coupling process is described in greater detail with reference to FIGS. 7 and 8. In FIG. 7 the main coupling parts 1, 2 are aligned with one another, and the claw 11 is engaged with the pin 10a. The locking pin 12, on the other hand, is in the retracted position in which the pin receptacle 69 is at a distance from the pin 10a for the attachment 4. The sliding part 20 which is connected to the locking element 71 is likewise in the retracted position. The power coupling part 5 is in the raised position.

The locking element 71 is displaced in the direction of the arrow 25 when the actuator 7 is actuated. At the same time, the cooperation of the sliding part 20 and the guide surface 22 causes the power coupling part 5 to be lowered. However, because of the presence of the second power coupling part 6 the protective cover 51 is not able to rest above the power coupling elements 18, and instead leans against the second power coupling part 6 under elastic pretension (FIG. 8).

In principle, it is possible to fold the protective cover 51 open and shut by using other guide means known to one skilled in the art, such as sliding guides and the like. The guide means according to the invention for the power coupling part are designed solely to automatically open the protective cover when the power coupling part is raised, and to automatically close the protective cover when the power coupling part is lowered. A mechanical connection to the drive of the locking device 8 for the main coupling parts is advantageous but not mandatory. The described mechanics for raising and lowering the power coupling part 5 may be implemented in various ways. The approach described above is merely one possible exemplary embodiment.

In principle, the invention is not limited to specific types of machines or to specific attachments. However, use is provided in particular for heavy machinery such as excavators, crawlers, or agricultural equipment, to which attachments such as excavator shovels or buckets, hammers, vibrating plate compactors, and the like must be affixed.

The invention claimed is:

1. A power source coupling for connecting two power coupling parts, comprising;
   a first power coupling part mounted on a first component so as to be longitudinally displaceable, and having a first connecting plate with one or more first power coupling elements,
   a second power coupling part mounted on a second component so as to be displaceably mounted between a first and a second position, and having a second connecting plate with one or more second power coupling elements which are able to cooperate with the one or more first power coupling elements when the first power coupling part is in the first position,
   mutually cooperating guiding and centering components provided on at least one of the first and second components and the first and second connecting plates to align the connecting plates relative to one another, and
   a protective element provided on the first power coupling part so as to be adjustable in position, and which in the first position of the power coupling part covers the first power coupling elements when the second power coupling part is not attached, and in the second position of the power coupling part is in an open position.

2. The power source coupling according to claim 1, wherein the protective element is situated on the first power coupling part so as to be pivotable about a rotational axis.

3. The power source coupling according to claim 1 further comprising a forced guidance of the protective element which causes the protective element to be swiveled or displaced from the first to the second position when the first power coupling part is displaced.

4. The power source coupling according to claim 1, wherein the protective element is pretensioned in the first position by a spring device.

5. The power source coupling according to claim 3, wherein the forced guidance is provided by guide surfaces situated on the first component and on the protective element.

6. The power source coupling according to one of claims 1 through 5, wherein the first component has two interspaced side parts, between which the first power coupling part is guided in a longitudinally displaceable manner.

7. The power source coupling according to claim 6, wherein the forced guidance is realized by a change in position of the movable protective element relative to the two interspaced side parts.

8. The power source coupling according to claim 6 or 7, further comprising guide surfaces on the stationary side parts that cooperate with corresponding guide surfaces on the protective element.

9. The power source coupling according to claim 1, further comprising an actuator for displacing the first power coupling part from the first to the second position, and vice versa.

10. The power source coupling according to claim 1, further comprising a tool coupling for mounting tools to a machine having the power source coupling.

11. The power source coupling according to claim 10, further comprising;
 a first main coupling part on which the first power coupling part is situated,
 a second main coupling part on which the second power coupling part is situated, and
 an actuator for displacing the first power coupling part.

12. The power source coupling according to claim 10, wherein the actuator drives a movable sliding part which is in mechanical connection with the first power coupling part.

13. The power source coupling according to claim 10, wherein the direction of displacement of the power coupling part is at an angle relative to the direction of displacement of the sliding part.

14. The power source coupling according to claim 10, wherein
 the first main coupling part includes two interspaced side parts on which a pin receptacle for a first pin of a tool is provided on one side, and
 the actuator which drives a movable locking device, which may be brought into engagement with a second pin of the tool, is provided in the space defined between the side parts.

15. The power source coupling according to claim 10, wherein the sliding part is connected to the movable locking device.

16. The ,power source coupling according to claim 15, wherein the sliding part is designed as a spline which cooperates with a guide surface of the first coupling part to produce a forcibly guided motion.

* * * * *